United States Patent [19]

Munch et al.

[11] Patent Number: 5,424,089
[45] Date of Patent: Jun. 13, 1995

[54] CARBONATED MAPLE SAP AND METHOD OF MAKING SAME

[76] Inventors: Richard F. Munch, R.D. #2, Box 398; Robert F. Munch, R.D. #2, Box 400, both of Poultney, Vt. 05764

[21] Appl. No.: 132,509

[22] Filed: Oct. 5, 1993

[51] Int. Cl.$^6$ ............................................. A23L 2/40
[52] U.S. Cl. .................... 426/590; 426/477; 426/658
[58] Field of Search ................. 426/590, 477, 658

[56] References Cited

U.S. PATENT DOCUMENTS 3,573,927 · 4/1971 Nessly ................................. 426/590

OTHER PUBLICATIONS

Label, Non Carbonated Vermont Maple Water, Vermont Maple Water, Inc., E. Arlington, Vt. 05262.
Label, 1990, Sparkling Vermont Nouveau Sapwater, Joseph Cerniglia Winery, Cavendish, Vt.
The Cem Saturator No. 250 No. 500 No. 1000, 1936 Catalogue, Crown Cork & Seal Company, Baltimore, Md.
G. H. Grimm Company Catalog, 1992, Rutland, Vt.
Maple Sirup Producers Manual Agriculture Handbook No. 134, C. O. Willits, U.S. Dept. of Agriculture, 1965, pp. 5-7, 38-41, 55-78 and 101-104.
Vermont Maple Products Law & Regulations, Jun. 1990, Title 6, Vermont Statutes Annotated, Chapter 32: Maple Products Law-Sections 481, 490, 492; Maple products Regulations: pp. 14-25.
Label, Vermont Maple-Tapped Sapwater, 1993, Maverick Sugarbush, Sharon, Vt. 05065.

*Primary Examiner*—Helen Pratt
*Attorney, Agent, or Firm*—Kenneth F. Kusyn

[57] ABSTRACT

Maple sap derived from a maple tree is carbonated with carbon dioxide gas to provide carbonated maple sap. A carbonated maple sap product is also provided wherein up to 75% by volume of the naturally occurring water content of the maple sap is removed, preferably to provide a sugar content of the product in the range of from about 2° Brix to about 8° Brix. The product may additionally comprise a flavoring ingredient, such as a fruit flavor, for complementing the maple sap product. The method includes gathering the maple sap from the maple tree, pasteurizing the sap for the elimination of harmful bacteria, cooling the pasteurized maple sap to a temperature above its freezing point, and then carbonating the maple sap with carbon dioxide gas to provide a refreshing and thirst quenching product, preferably in the form of a beverage for human consumption.

7 Claims, No Drawings

CARBONATED MAPLE SAP AND METHOD OF MAKING SAME

BACKGROUND OF THE INVENTION

1. Field of the Invention

The present invention relates to carbonated maple sap, and more particularly to a carbonated maple sap product and a method for making the same.

2. Related Art

Maple sap is a naturally occurring, unprocessed crystal-clear liquid, having the consistency and clarity of water, which derives from the sugar maple tree (Agriculture Handbook 134, U.S. Department of Agriculture, Maple Syrup Producers Manual, page 55; see also Title 6, Section 481 (9) of the Vermont Statutes Annotated, Vermont Maple Products Law). It is generally available from the sugar maple tree during the late winter and early spring. Maple sap has a sugar content anywhere from approximately 2° to 5° Brix, the majority of the sugar content being sucrose and glucose. The remainder of the maple sap content is naturally occurring water and very small amounts of organic acids, a portion of which is responsible for the maple flavor. It is not to be confused with "maple syrup" which is the viscous liquid obtained by concentration and heat treatment of maple sap (Section 481(12) of Title 6 of the Vermont Statutes Annotated).

In connection with providing the sugar content of maple sap, the degrees Brix is a scale that is used for measuring the density of sugar in solution. The "degrees Brix" (° Brix) means that the solution under consideration has the same density as a solution containing a percentage of sugar numerically equal to the Brix value.

It is known in the art to remove the water content that is naturally present in maple sap during the production of maple syrup in order to market and sell the water as non-carbonated, "pure and natural distilled and condensed Maple Steam" (available as "Vermont Maple Water" from Vermont Maple Water, Inc., East Arlington, Vt. 05252). It is also known to remove the water from maple sap by a reverse osmosis process, filter the water, and then subject the water to carbonation to provide a "Nouveau Sapwater" product available from Sparkling Vermont Nouveau Sapwater, produced by Joseph Cerniglia Winery, Cavendish, Vt., and also to provide a "Vermont Maple-Tapped Sapwater" available from Maverick Sugarbush, Inc., of Sharon, Vt.

SUMMARY OF THE INVENTION

It has been surprisingly discovered that naturally occurring maple sap derived from a maple tree can be carbonated with carbon dioxide gas to provide carbonated maple sap. According to one aspect of the invention, maple sap can be combined with a food or beverage grade $CO_2$ gas to provide a refreshing, thirst quenching product, in the form of a beverage for human consumption. The product is uniquely invigorating in that the naturally occurring sugar content of the sap, together with its distinct maple flavor, provides the basis for the refreshing and thirst quenching aspects when carbonated with the $CO_2$ gas.

In another aspect of the invention, the sweetness and maple flavor of the carbonated maple sap can be further emphasized and enhanced by providing a product comprising carbonated maple sap wherein a portion of the naturally occurring water content of the maple sap liquid is removed, for example, up to about 75% by volume, depending on the sugar content of the maple sap that is obtained from the tree in any given batch. Thus, a sufficient amount of naturally occuring water content may be removed from the maple sap to provide a sugar content in the range of from about 2° Brix to about 8° Brix, preferably from about 3° Brix to about 5° Brix.

In yet another aspect of the invention, a natural or artificial flavoring ingredient can be added to the carbonated maple sap product, such as a fruit flavor, to provide a flavor for complementing the product, thereby offering a selection to the public for the manner or liking in which they may quench their thirst.

A further aspect of the invention includes a method for making a carbonated maple sap product which comprises the steps of gathering the naturally occurring maple sap from its respective maple tree, and then pasteurizing the maple sap for the elimination of harmful bacteria. Once the maple sap has been pasteurized, the sap is cooled to a temperature above its freezing point, preferably from about 35° F. to about 40° F. After cooling, the maple sap is carbonated with carbon dioxide gas, preferably with a food or beverage grade $CO_2$ gas and filtered to remove impurities. A refreshing, thirst quenching product is obtained, preferably in the form of a beverage for human consumption.

Another aspect of the method of the invention further comprises the step of removing up to 75% by volume of the naturally occurring water content of the maple sap prior to the carbonation step, preferably by a reverse osmosis process, and more specifically, removing a sufficient amount of the naturally occurring water content to produce a sugar content of the product in the range of from about 2° Brix to about 8° Brix, preferably 3° Brix to about 5° Brix.

Another aspect of the method according to the invention herein comprises the step of adding a flavoring ingredient, preferably a fruit flavor, to complement the carbonated maple sap product.

DETAILED DESCRIPTION OF THE INVENTION INCLUDING PREFERRED EMBODIMENTS THEREOF

As noted herein, maple sap is obtained from the sugar maple tree in the form of a clear, transparent liquid that mainly comprises naturally occurring water and from about 2°-5° Brix sugar content. The sugar content will depend upon a number of factors including the time of season when the sap is withdrawn from the tree, the tree location, the sun exposure to the tree, and the size and age of the tree. The maple sap is gathered from the maple tree in any conventional manner, and placed in a refrigerated holding tank where it is stored at a temperature of approximately 35° F. to 40° F. to prevent spoilage.

The stored sap is then subjected to a pasteurizing process by pumping it into, for example, a vat-type pasteurizer such as a Damro Brothers, Co. 150 gallon vat pasteurizer, and heating the maple sap with steam to a minimum temperature of 178° F. for a period of at least 3 minutes or longer to insure the elimination and destruction of harmful bacteria. Typically, the maple sap is subjected to a temperature of approximately 200° F. for approximately 5 minutes.

After pasteurization, the maple sap is immediately cooled to a temperature above its freezing point, preferably from about 35° F. to about 40° F. and preferably in the same vat container, by pumping cooled or refrigerated water into the same jacket of the pasteurizer that was used for steam heating the maple sap during the pasteurization step. The pasteurized maple sap is cooled to as low a temperature as possible without freezing so that the maple sap will readily and efficiently accept the absorption of $CO_2$ gas during the carbonation process step.

After the pasteurized maple sap is cooled to the desired temperature, it is pumped into a carbonation apparatus, such as a CEM Saturator manufactured by the Crown Cork and Seal Company, and passed over a series of plates contained in a tank into which carbon dioxide gas, specifically a beverage or food-grade $CO_2$ gas, is admitted into the tank under a pressure of from about 35 to about 65 psig. In this manner, carbonation of the pasteurized maple sap is almost instantaneous.

Once the carbonation of the maple sap is complete, the carbonated maple sap is then filtered, preferably with a 38 micron filter, and thereafter with a finer filter, preferably a 5 micron or less fiber filter, to remove any impurities and/or precipitates, such as sugar sand and minerals that have adsorbed to each other to form unsightly or undesireable substances in the finished product. After filtration, the carbonated maple sap is forwarded to an apparatus for packaging or bottling the product into a suitable container for distribution.

It will be appreciated that before or after the pasteurization process, a certain amount of the water content of the maple sap can be removed to enhance and emphasize its sweetness and maple flavor. This is accomplished by a conventional reverse osmosis process wherein up to 75% by volume of the naturally occurring water content of the maple sap can be removed to produce a beverage product without degrading the natural taste and consistency of the maple sap. The amount of water that is removed will largely depend on the sugar content contained in the maple sap when it is obtained from the maple tree. For example, if the sugar content of the maple sap is at the lower end of about 2° Brix or less, and it is desired to bring the sugar content up to approximately 8° Brix, then approximately 75% by volume of the water content will be removed. The level of 8° Brix sugar content is generally an upper limit beyond which the carbonated maple sap product will begin to be overly sweet so as to detract from the refreshing and thirst quenching aspects of the product. Thus, the desireable sugar content of the finished product will generally be in the range of from about 2° Brix to about 8° Brix, and preferably from about 3° Brix to about 5° Brix. Accordingly, as much water can be removed from the maple sap as is necessary to provide the foregoing sugar contents in the final product in order to tailor the sweetness of the product for accommodating varying tastes.

The reverse osmosis process for removing the desired amounts of naturally occurring water from the maple sap generally includes forcing the maple sap against a membrane under a high pressure, e.g., 500 psig, whereupon the water portion of the sap is forced through the membrane for separation and then removed. Suitable equipment for employing the reverse osmosis process may be accomplished with a Springtech Maple Sap Concentrator available from the Springtech Company of St. Albans, Vt.

It may also be desireable to add a natural or artificial flavoring ingredient to the maple sap prior to the pasteurization step to provide a complementary flavor to the product. Fruit flavors have been found to be particularly advantageous for complementing the product and may include any one or combination of orange, apple, grapefruit, pineapple, strawberry, raspberry, cranberry, lime, lemon, grape, or peach, or any other suitable flavor, such as vanilla or chocolate that will enhance the refreshing quality of the beverage. Generally these ingredients will be added to the maple sap product in a flavoring amount, i.e., an amount that will not overpower the natural taste and flavor of the maple sap, which will generally be less than about 1% by volume of the final product.

While the invention has been described in detail with respect to preferred embodiments thereof, it is to be understood that upon a reading of the foregoing description, variations to the embodiments disclosed may occur to those skilled in the art and it is intended to include such variations within the scope of the appended claims.

What is claimed is:

1. Carbonated, unboiled, naturally occurring, maple sap having a sugar content of about 2° to about 5° Brix.

2. A product comprising unboiled naturally occurring carbonated maple sap having a sugar content of about 2° to about 5° Brix, and a flavoring ingredient.

3. The product of claim 2 wherein the flavoring ingredient comprises a fruit flavor.

4. A method for making a carbonated naturally occurring maple sap product consisting of the steps of:
   gathering a naturally occurring maple sap from its respective maple tree;
   pasteurizing the maple sap without boiling for the elimination of harmful bacteria;
   cooling the pasteurized maple sap to a temperature above its freezing point;
   carbonating the maple sap with carbon dioxide gas to produce a carbonated maple sap; and
   filtering the carbonated maple sap to remove impurities.

5. The method of claim 4 wherein the method additionally consists of the step of adding a flavoring ingredient.

6. The method of claim 5 wherein the flavoring ingredient comprises a fruit flavor.

7. The method of claim 4 wherein the pasteurized maple sap is cooled to a temperature of from about 35° F. to about 40° F.

* * * * *